June 27, 1961 P. MOSER 2,989,916
BALING PRESSES
Filed Sept. 16, 1958 3 Sheets-Sheet 1

INVENTOR
PAUL MOSER
BY HESTERN and KOLLIN
ATTORNEYS

June 27, 1961 P. MOSER 2,989,916
BALING PRESSES
Filed Sept. 16, 1958 3 Sheets-Sheet 2
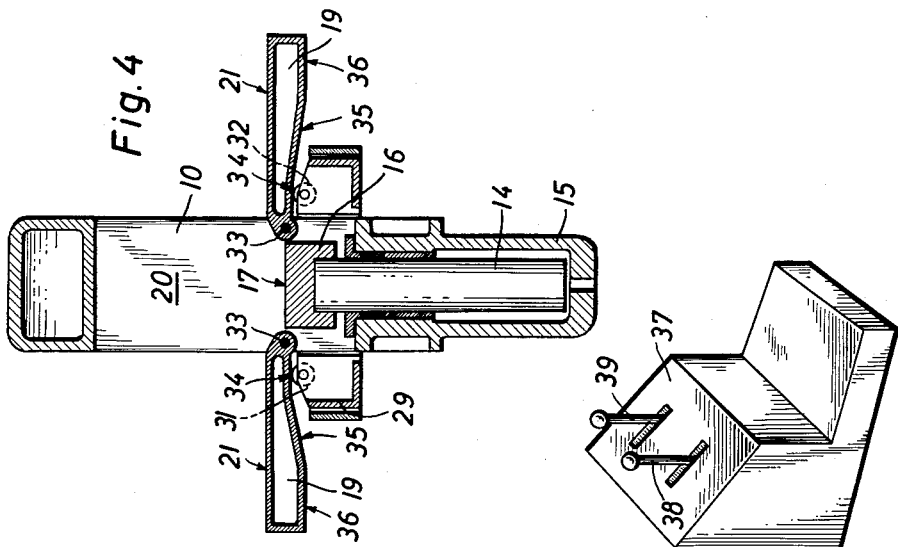
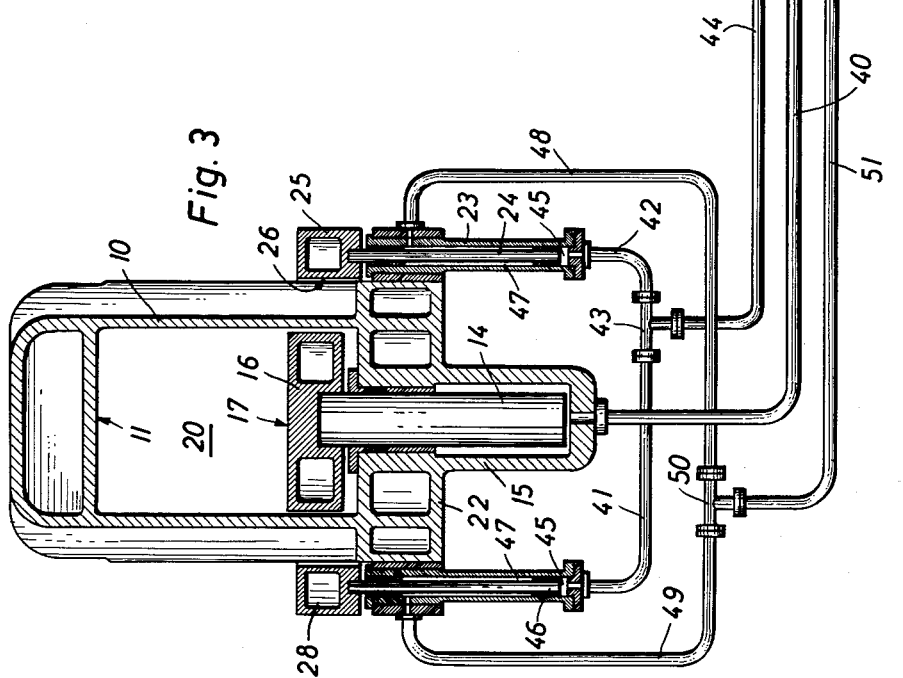
INVENTOR
PAUL MOSER
BY HESTERN and KOLLIN
ATTORNEYS

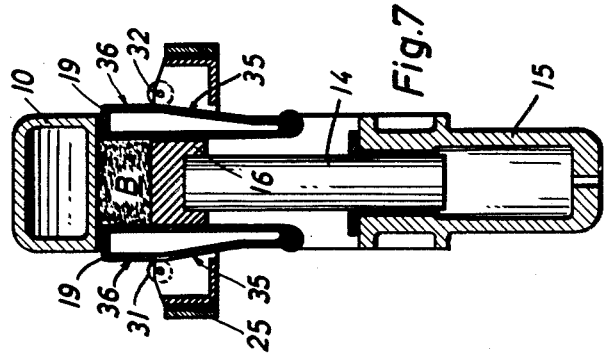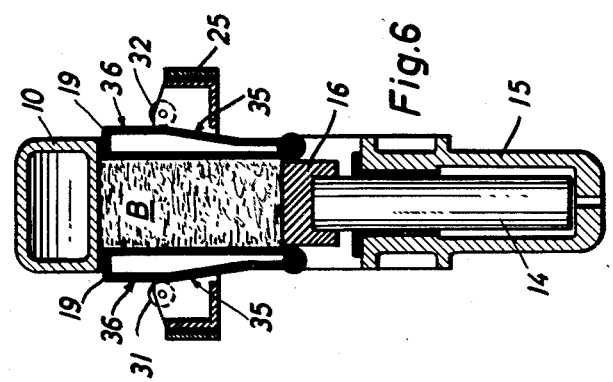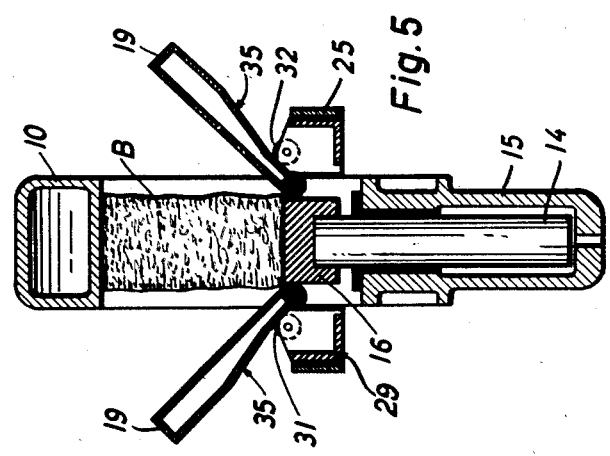

United States Patent Office 2,989,916
Patented June 27, 1961

2,989,916
BALING PRESSES
Paul Moser, Buderich, near Dusseldorf, Germany, assignor to Waldemar Lindemann, Dusseldorf, Germany
Filed Sept. 16, 1958, Ser. No. 761,305
Claims priority, application Germany Sept. 21, 1957
3 Claims. (Cl. 100—232)

It is customary to compress cotton and wool in plantations or factories into relatively light bales for land transport. Such bales have too great a bulk for overseas transport. It is, therefore, usual to compress the bales to a still smaller volume before they are loaded on board ship.

Simple presses having only two opposite press plates are not suitable for the further compression of the bales because in these the bales may be given an undesired alteration in shape and their volume is not reduced to the extent desired. Therefore, for making bales suitable for loading on ships special presses have been developed in which the only slightly compressed bales are subjected to a "combined" pressure, that is to say the pressure is exerted from at least two and usually three sides and, in any case, in two directions at right angles to one another. For this purpose at least one side wall of the press chamber and usually two opposite side walls are in the form of flaps which can be pivoted. When the flaps are opened the press chamber, besides the actual press ram or plunger and the fixed surface opposite to it, is bounded at the most by three but usually by only two fixed side walls. After introducing the bale to be compressed the flaps are first closed, so that the bale is given a certain amount of pre-compression. When the flaps are closed, that is to say when the bale has already assumed the shape of the press chamber, the press ram is set into operation in order to compress the bale further and to bring it to the desired final volume.

Presses of the above-mentioned kind, owing to the complicated driving means required for the flaps, are expensive to manufacture and take up a great deal of space. A purpose of the invention is to obviate this disadvantage.

The press of the invention has, like the known presses, a press ram operating in a press chamber having at least one side wall in the form of a flap which can be pivoted. According to the invention, the closing of the flap or flaps is effected by a power-operated sliding member having pressure means, for example in the form of rollers, which act on the outer surfaces of the flaps which are wedge-shaped or curved. As is hereinafter described in detail, not only is the press thus of simple construction requiring little space, but its driving means is also better suited to the power and pressure conditions than the driving means of the known presses. The force exerted by the sliding member on the flap or flaps first acts on the open flap with a short lever arm at the beginning of the closing movement when only the weight of the flap and not the resistance of the bale has to be overcome, and therefore causes the flap to turn about its pivot with a high angular velocity although the turning moment is small. During the course of the movement of the flap the length of the lever arm and with it the turning moment continuously increase, while the power for the slide remains the same, which stems from the fact that a continuously increasing pressing pressure must now be produced.

In the simplest form of construction the outer surfaces of the flaps are wedge-shaped, that is to say inclined and flat. Stated more exactly the surfaces of the flaps which press against the bale run at an acute angle to the surfaces which the roller or other engaging parts of the sliding member engage. The outer inclined surfaces of the flaps may be in an even or straight plane, but can just as well be curved surfaces. Then the angle between the inner surface of the flap to be closed and the tangent at the point of contact of the roller, or other engaging part, to the curved surface is the deciding factor. In this way, similarly as with a cam drive, the pressing force can be varied in any desired manner and adapted to suit the variations in the resistance to be overcome.

It is particularly advantageous to make the wedge-shaped or curved outer surfaces of the flap merge near the ends of the flap into plane surfaces which are parallel to the direction of movement of the sliding member when the flaps are closed. In this way, towards the end of the movement of the sliding member when the flaps are closed they become locked so that the driving means for the flaps is completely relieved from the reaction of the ram pressure.

A constructional embodiment of a press in accordance with the invention is illustrated by way of example in the accompanying drawing, in which:

FIGURE 3 is a section on the line III—III of FIGURE 2, also showing the hydraulic equipment;

FIGURE 4 is a section on the line IV—IV of FIGURE 2, the flaps being included and;

Figure 1:
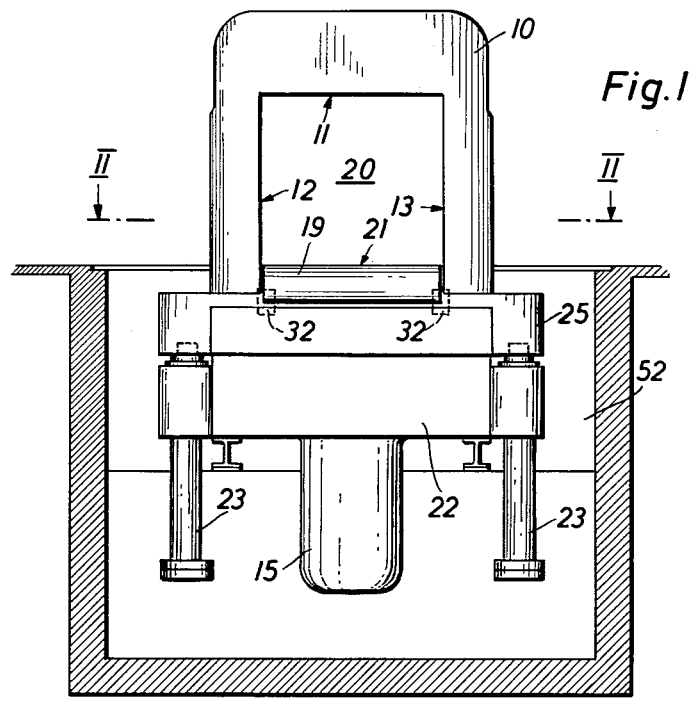
FIGURE 1 is a side elevation of a press according to this invention having a supporting foundation which is shown in section.

FIGURES 5, 6 and 7 are views similar to FIGURE 4 but showing the flaps which produce the lateral pressure in successive operating positions as shown in the drawing, the rectangular frame 10 of the press has three fixed surfaces 11, 12 and 13 which surround a press chamber generally designated by the reference numeral 20. In the press chamber 20 is a ram 16 which is movable vertically and is driven hydraulically by a piston 14 in a cylinder 15, see FIGURE 3. The end face 17 of the ram 16, which is displaceable toward the surface 11 on the yoke of the frame 10, forms a fourth boundary wall of the press chamber.

Figure 2:
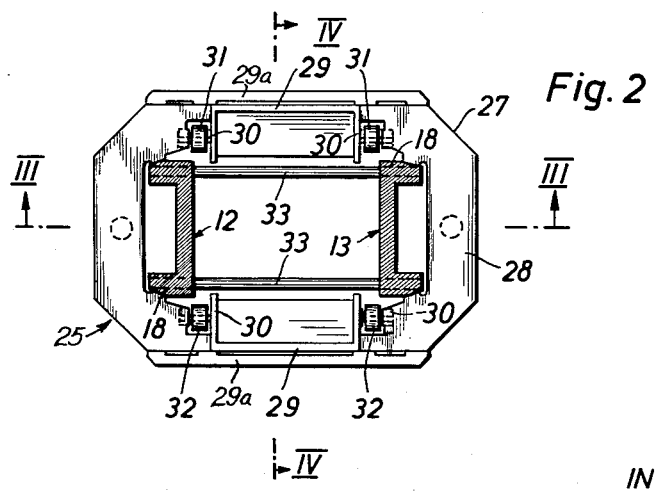
FIGURE 2 is a cross-section on the line II—II of FIGURE 1, the flaps producing the lateral pressure being omitted in order that other important parts may be visible.

Two flaps 19 are pivotally mounted in bearings 18, see FIGURE 2. The inner surfaces of these flaps form, when they are closed, as shown in FIGURE 7, the fifth and sixth walls of the prismatic press chamber.

Hydraulic cylinders 23 having pistons 24 movable vertically therein are fixed at opposite sides, as shown in FIGURES 1 and 3, to the lower part 22 of the frame 10, the middle of which is provided with the cylinder 15. These pistons 24 constitute the means for guiding and driving a frame 25 which has a central polygonal aperture 26, the corners 27 being cut off. The shorter sides 28 and the longer sides 29 of frame 25 surround said polygonal aperture, as is shown in FIG. 2. The sides 28 and 29 of the frame 25 have a hollow box profile as shown in FIGURE 3. In the longer sides 29, however, as shown in FIGURE 4, the upper and inner walls of the box are partly cut away in order to provide space for bearings 30 for pairs of rollers 31 and 32 carried by frame 25 and acting on the flaps 19, in a manner to be hereinafter described, when the frame 25 is moved upwards by the hydraulic drive 23, 24. The frame 10 projects through the aperture 26, as shown in FIG. 3. The sides 29 of frame 25 are reinforced by the plates 29a as shown in FIGURE 2. The rollers of the pair of rollers 31 are coaxial as are also the rollers of the pair 32. All four rollers are freely rotatable in their bearings 30 and, as shown in FIGURE 4, project slightly beyond the upper surface of the frame 25. In FIGURE 2 the rollers are visible because the flaps 19 have been removed. Only the axes 33 of the flaps which extend between the bearings 18 are visible.

The outer surface of each flap 19 consists of a short-starting section 34 which is parallel to the inner surface 21, a longer middle section 35 which is slightly inclined to the inner surface and an end section 36 which is again parallel to the inner surface 21. This end section 36 is longer than the starting section 34 but is shorter than the middle section 35. When the flaps are wide open, as shown in FIGURE 4, the pairs of rollers 31 and 32 bear against the starting sections 34. The transitions between the three sections are rounded off smoothly.

A control post 37 having two levers 38 and 39 is provided for the operator. A hydraulic pump, together with a motor, and a container for the hydraulic liquid can also be disposed in a box in the control post. These components of the hydraulic installation are not illustrated in the drawing. A pipe 40 leads from the cylinder 15 to the control post 37. Pipes 41 and 42, which are connected at 43, lead into a pipe 44. The pipes 41 and 42 lead into the lower ends 45 of the cylinders 23 respectively. The dimensions of the pistons 24 are such that only their lower ends 46 completely fill the bore of the cylinder 23. Chambers 47 are, therefore, formed above the ends 46. Pipes 48 and 49 are connected respectively to the chambers 47 and are joined at 50 to a pipe 51. The pipes 40, 44 and 51 lead to the components of the hydraulic installation in the control post 37. Only the pipes and the control post are shown in FIGURE 3.

The apparatus operates in such a way that movement of the lever 38 in one direction delivers pressure medium to the cylinder 15, so that the piston 14 raises the ram 16. When the lever is returned to its central position the pipe 40 is closed and the piston 14, together with the ram 16, remain stationary. If the lever 38 is moved in the opposite direction, the pipe 40 is opened, so that the pressure medium can flow and the piston together with ram 16 may be lowered under the action of gravity. The hydraulic drive 23, 24 is controlled in a similar manner by means of the lever 39. If the lever 39 is moved in one direction pressure medium is supplied to the chambers 45 below the pistons and the chambers 47 are simultaneously opened. Consequently, the pistons 24 move upwards with the frame 25. When the lever 39 is in its middle position, the pipes leading to all the chambers are closed, so that the pistons 24 and the frame 25 remain stationary. If the lever 39 is moved in the opposite direction the pipes leading to the chambers 45 are opened and pressure medium is simultaneously supplied to the chambers 47. The frame 25 is thereby moved downwardly.

The method of operation of the press will now be explained in greater detail with reference to FIGURES 4-7.

When the flaps are fully open, as shown in FIGURE 4, a bale, for example of cotton, which is to be compressed, is introduced into the press chamber from one side or the other. At this time the ram 16 is in its lowest position. Owing to the press being mounted in a trough or recess, as shown in FIGURE 1, charging is very simple, because the surfaces 21 of the flaps 19 are at floor level.

When the bale, which is indicated by the reference letter B in FIGURES 5-7, has been introduced into the chamber 20, the hydraulic drive 23, 24 is engaged so that the frame 25 is moved upwards. During this movement the rollers 31, 32 act on the outer surfaces of the flaps 19 and close the flaps. In the first phase of their movement the distance between the point of contact of the rollers and the pivot point of the corresponding flap is small. This accords with the fact that at the beginning of the closing movement the resistance of the flaps is small and is only due to their own weight. Therefore, the flaps 19 move relatively quickly into a position in which their surfaces 21 make only a small angle with the vertical. Then the rollers pass from the starting sections 34 on the outer surfaces of the flaps on to the inclined middle sections 35 and the compression of the bale B begins. While the rollers 31, 32 move along the middle sections 35 the flaps act like cam faces. Consequently, a very high pressure in the horizontal direction can be exerted by the flaps on the bale B with a relatively small force which is produced in the vertical direction by the hydraulic drive 23, 24.

The process described is completed when the rollers pass on to the straight end sections 36 of the outer surfaces of the flaps 19, as shown in FIGURE 6. Further movement of the frame 25 is then no longer necessary, because it would result in no further movement of the flaps. However, in this position, the rollers 31, 32 act as a means for holding the flaps closed without it being necessary to apply hydraulic pressure for this purpose.

In the last phase of the process, the bale B which has been pre-formed by the flaps 19 is compressed by the ram 16 in the chamber 20. In FIGURE 7 the ram 16 has arrived at its highest position. The pressure, which acts on all sides in the chamber during the compression by the ram, is very considerable. It is, however, safely taken by the rollers 31 and 32 in the manner previously described.

The removal of the compressed bale takes place after the ram 16 has been lowered and the flaps 19 have been opened. The opening is completed automatically by the action of gravity when the frame 25 is moved downwards.

The press shown in the drawing is only an example of a press constructed in accordance with the invention. It is possible to construct the press with only one flap and to provide a rigid wall on the side of the press chamber which is opposite the inner surface of the flap when the flap is closed. In order to re-open the flaps 19, frame 25 is lowered. When the rollers 31, 32 have passed from the sections 36 to the sections 35 of the outer surfaces of the flaps, they allow the latter to swing outwardly, and the flaps will be able to move from the positions shown in FIG. 6 to those illustrated in FIGS. 4 and 5 when the frame is lowered. The flaps can either be moved manually or else may be caused to move by dint of vibration and other movements of the whole press when the frame and the ram are moved downwardly. It is also possible, without departing from the invention, to make the part of the outer surface of the flap which is inclined to the inner surface curved instead of plane. The inclination of the surface is then the angle which a tangent to the curved surface forms with the inner surface of the flap.

I claim:

1. A baling press comprising a press chamber having side walls and end walls and being adapted to receive a bale to be compressed; a ram movably disposed in said chamber and forming one of said end walls; means for driving said ram; a pivotally mounted flap which in its closed position forms one of said side walls; said flap having an outer surface and an inner surface, a first section of said outer surface being inclined to said inner surface in such a way that the distance between the outer surface and the inner surface increases as the distance from the pivotal axis increases, a second section of said outer surface forming an extension of said first section and running parallel to and at a distance from said inner surface, which distance equals the maximum distance of said first section from said inner surface; and means for driving said flap independently of said ram comprising a pressure member adapted to forcibly be moved over, and in contact with, the said sections of said outer surface and in a direction at right angles to the pivotal axis of said flap.

2. A baling press comprising a press chamber having side walls and end walls and being adapted to receive a bale to be compressed; a ram movably disposed in said chamber and forming one of said end walls; means for driving said ram; two pivotally mounted flaps arranged symmetrically opposite one another, each forming in their closed position one of said side walls, each having an outer surface and an inner surface, a first section of said outer surface being inclined to said inner surface in such a way that the distance between said outer surface and said inner surface increases as the distance from the pivotal axis increases, and a second section of said outer surface forming an extension of said first section and running parallel to and at a distance from said inner surface, which distance equals the maximum distance of said first section from said inner surface; and means for driving said flaps independently of said ram and comprising a pressure member for each flap adapted to forcibly be moved over, and in contact, with said sections of said outer surface and in a direction at right angles to the pivotal axes of said flaps.

3. A baling press as claimed in claim 2, in which said pressure members are mounted on a vertically movable frame to which said means for driving said flaps are connected.

References Cited in the file of this patent

UNITED STATES PATENTS

| | | |
|---|---|---|
| 31,784 | Cooper | Mar. 26, 1861 |
| 522,220 | Liddell | July 3, 1894 |
| 813,603 | Washington | Feb. 27, 1906 |
| 1,541,288 | Smith | June 9, 1925 |
| 1,616,838 | Wright | Feb. 8, 1927 |
| 1,702,913 | MacLean | Feb. 19, 1929 |
| 1,721,839 | Shoemaker | July 23, 1929 |
| 1,925,365 | Berg | Sept. 5, 1933 |